Figure 1:
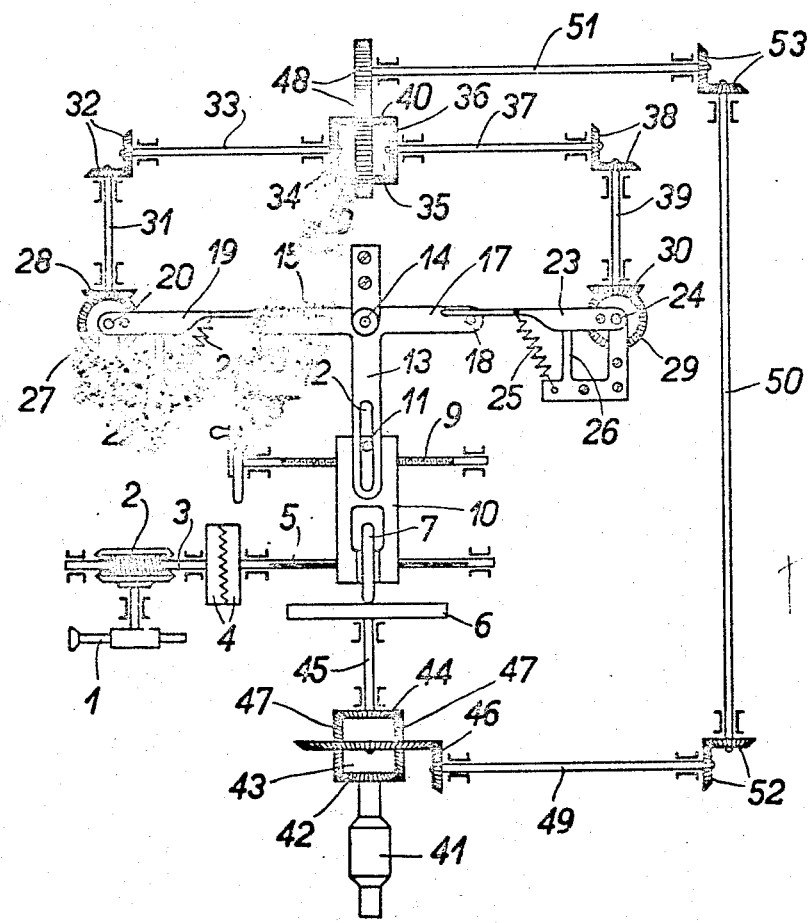

Sept. 4, 1945.    K. PAPELLO    2,384,043
DEVICE FOR DIRECTING AND CALCULATING APPARATUS
Filed Feb. 8, 1940    4 Sheets-Sheet 1

Inventors:
Karl Papello

Sept. 4, 1945.  K. PAPELLO  2,384,043
DEVICE FOR DIRECTING AND CALCULATING APPARATUS
Filed Feb. 8, 1940  4 Sheets-Sheet 2

Inventors:
Karl Papello

Sept. 4, 1945.  K. PAPELLO  2,384,043
DEVICE FOR DIRECTING AND CALCULATING APPARATUS
Filed Feb. 8, 1940  4 Sheets-Sheet 3

Inventors:
Karl Papello

Sept. 4, 1945. K. PAPELLO 2,384,043
DEVICE FOR DIRECTING AND CALCULATING APPARATUS
Filed Feb. 8, 1940 4 Sheets-Sheet 4

Inventors:
Karl Papello

Patented Sept. 4, 1945

2,384,043

UNITED STATES PATENT OFFICE 2,384,043

DEVICE FOR DIRECTING AND CALCULATING APPARATUS

Karl Papello, Jena, Germany; vested in the Alien Property Custodian

Application February 8, 1940, Serial No. 318,000
In Germany January 31, 1939

7 Claims. (Cl. 74—388)

Devices for displacing a body according to the movement of another body of variable speed, as employed in connection with directing and calculating apparatus, are known which are on the one hand equipped with a speed changing gear connected with a motor and where the driven shaft of said speed changing gear is coupled with the body to be displaced and which, on the other hand, contain actuating means coupled with the adjusting device of the speed changing gear as well as with the body to be displaced, so that the latter can be simultaneously and directly actuated by the motor, via the speed changing gear, and by the actuating means and that every alteration in the angular speed imparted to the object body via the speed changing gear results in an additional displacement of the object body. Devices of this kind are very well suitable, for instance, for following up aircraft with the aid of hand-controlled sighting telescopes or for the tele-control of bodies with the aid of a transmitting and receiving system where the speed of the bodies to be displaced is relatively low, while the said devices are less satisfactory where a higher speed of displacement is required.

According to the present invention devices of the said kind are obtained, i. e. devices which may be less satisfactory for lower speeds, but excellent for higher speeds of displacement, if provision is made of a differential gear, disposed between the motor and the driving shaft of the speed changing gear, and of means which so influence said differential gear that the absolute values of the angular speeds of the driving shaft and of the driven shaft of the speed changing gear always change in the same sense whenever the adjusting means are displaced by the actuating means. If the speed changing gear in question is one whose driven shaft can rotate either in one as well as in the other direction of rotation, it will be of advantage to provide a mechanical or electrical device by means of which the influence upon the differential gear is reversed at the moment when the direction of rotation of the driven shaft of the speed changing gear is changed.

In the case of devices for displacing a body in accordance with the movement of the receiver of an electric tele-transmitting system it is advisable on the one hand to provide the means for actuating the adjusting device of the speed change gear with a follower mechanism of whose two mutually adjustable parts one is in a known fashion coupled with the body to be displaced and the other with the receiver, and on the other hand to provide control means which are coupled to said follower mechanism and serve for releasing a power driven adjustment of the adjusting device of the speed change gear when a difference should arise between the speed of said two parts, said adjustment keeping on until said difference in speed is eliminated by the change in speed of the object to be displaced.

An advantageous constructional model of a device of such design is obtained if said controlling means serve for controlling two electro-magnets each of which belongs to the controlling device of one of two disengageable clutch through which a motor, (preferably the motor connected with the speed changing gear) can be made to act in one or the other direction upon the regulating device of the speed changing gear.

Another suitable constructional model of a device of such design will result if said controlling means serve for so controlling two reversible motors (one of which is coupled to the regulating device of the speed changing gear and the other to the differential gear) that the motors will start as soon as a difference in speed occurs between the two parts of the follower mechanism displaceable relatively to one another, the direction of rotation of the motors depending upon the sign governing the difference in speed. In the event of the direction of rotation of the driven shaft of the speed changing gear being reversible, it will be expedient to coordinate a controlling device to the reversible motor coupled to the differential gear in order to automatically reverse the direction of rotation of said motor when the direction of rotation of the driven shaft is changed, irrespective of what sign may govern the then prevalent difference in speed between said two parts.

The new devices as described in the aforegoing and which, as pointed out before, only give satisfactory results where the bodies in question are to be displaced at high speeds, can be still further so improved that they are well suited also for lower displacing speeds in that—similar as in the case of the known gears of the aforementioned kind—the actuating means are so coupled with the body to be displaced that the latter during the operation of the actuating means is additionally displaced.

Figure 2:
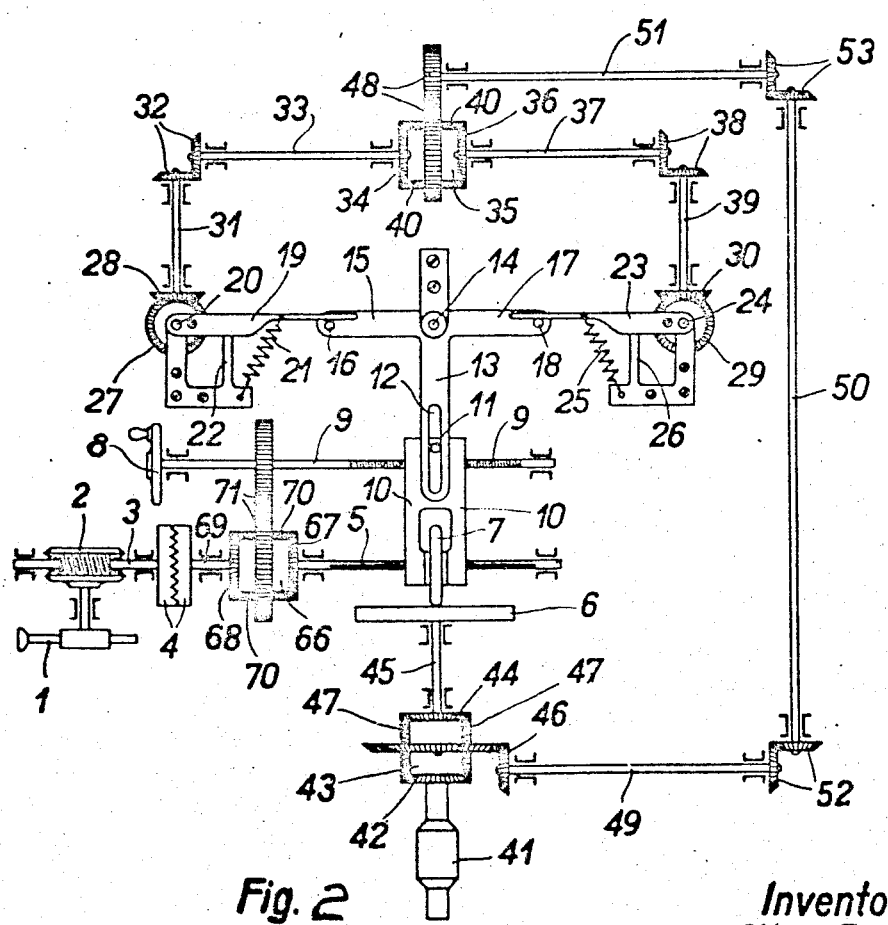

In the accompanying drawings diagrammatical illustrations are given of four constructional examples of a device according to the invention. In Figs. 1 and 2 directing apparatus are illustrated for following up an aircraft by means of a sighting telescope, and in Figs. 3 and 4 devices for adjusting a body in accordance with the movement of the receiver of an electrical tele-transmitting system.

The directing apparatus according to Fig. 1 embodies a sighting telescope 1 which, by means of a worm gearing 2, is actuated through a shaft 3 which, with the aid of a clutch coupling 4, can be coupled with the driven shaft 5 of a speed changing gear. The latter is a friction gearing containing a friction disc 6 and a friction wheel 7. The friction wheel 7 is disposed displaceably along the shaft 5 which is provided with a groove. A spindle 9 which is actuated by means of hand wheel 8 and which, by means of a thread, engages a carrier 10 for the friction wheel 7, serves for displacing this wheel. The carrier 10 is provided with a pin 11 engaging in a slot 12 of arm 13 of a triple arm lever. This lever is pivotally mounted around a permanent pin 14 in such a way that it experiences a rotation about the axis of pin 14 when the carrier 10 is displaced by the manipulation of hand wheel 8. Each of the two other arms, 15 and 17, of the said lever is fitted with a pin 16 and 18, respectively. Pin 16 cooperates with a lever 19 pivotally mounted around a permanently disposed pin 20. The lever 19 does not experience any rotations about the pin 20, unless the carrier 10 moves in such a manner that the friction wheel 7 occupies positions between its central position, as illustrated in the drawings, where it touches the centre of the friction disc 6 and that respective end position where it touches the left edge of the friction disc 6. By means of spring 21 the lever 19 is held in engagement with the pin 16 until it lies against a permanent arresting stop 22, which will be the case when the friction wheel 7 occupies its central position. The pin 18 cooperates with a lever 23 which is pivotally disposed around a permanently fitted pin 24. The lever 23 does not experience any rotations about the pin 24, unless the carrier 10 moves in such a manner that the friction wheel 7 occupies positions between its central position and that respective end position where it touches the right edge of the friction disc 6. By means of a spring 25 the lever 23 is held in engagement with the pin 18 until it lies against a permanent arresting stop 26, which will be the case when the friction wheel 7 occupies its central position. With the lever 19 is firmly connected a bevel gear 27 meshing with a bevel gear 28. With the lever 23 a bevel gear 29 meshing with a bevel gear 30 is firmly connected. By means of a shaft 31 as well as by a pair of bevel gears 32 and by a shaft 33 the rotations of the bevel gear 28 are imparted to a crown wheel 34 of a differential 35 whose other crown wheel 36—by means of a shaft 37 by a pair of bevel gears 38 and by a shaft 39—is coupled with the bevel gear 30 in such a way that the planet pinions 40 of the differential 35 with equal and opposite displacements of the friction wheel 7 from its central position, are rotated by equal amounts and in the same rotational sense about the coinciding axes of the crown wheels 34 and 36. For driving the friction gearing 6, 7 a motor 41 having a constant number of revolutions is provided for which actuates the one crown wheel 42 of a differential 43 whose other crown wheel 44 is disposed on the shaft 45 of the friction disc 6. The differential 43 is so coupled with the differential 35 that with displacements of friction wheel 7 out of the centre of friction disc 6 the crown wheel 44 is rotated in the same sense as by the motor 41. For this purpose a pair of bevel gears 46—which are intended to impart to the planet pinions 47 of the differential 43 a rotation about the coinciding axes of the crown wheels 42 and 44—by means of three shafts 49, 50 and 51 and two pairs of bevel gears 52 and 53 is coupled with a pair of spur wheels 48 intended to impart to the planet pinions 40 of the differential 35 a rotation about the coinciding axes of the crown wheels 34 and 36.

In use the telescope 1—with disengaged clutch coupling 4—is to be pointed to the aircraft to be followed. This done, the clutch coupling 4 is to be engaged and the telescope 1 kept pointed to the aircraft by manipulating the hand wheel 8.

The apparatus as shown in Fig. 2 differs from the apparatus according to Fig. 1 only in a differential 66 being interposed between clutch coupling 4 and the grooved shaft 5. One of the crown wheels 67, of the said differential is mounted upon shaft 5, while the other crown wheel 68 is fitted to shaft 69 supporting one section of clutch coupling 4. By means of a pair of spur gears 71 the planet pinions 70 of the differential 66 are so coupled with the spindle 9 that the angular velocity of shaft 69 is greater than that of the grooved shaft 5 when a displacement of the friction wheel 7 out of the centre of the friction disc 6 takes place.

Figure 3:
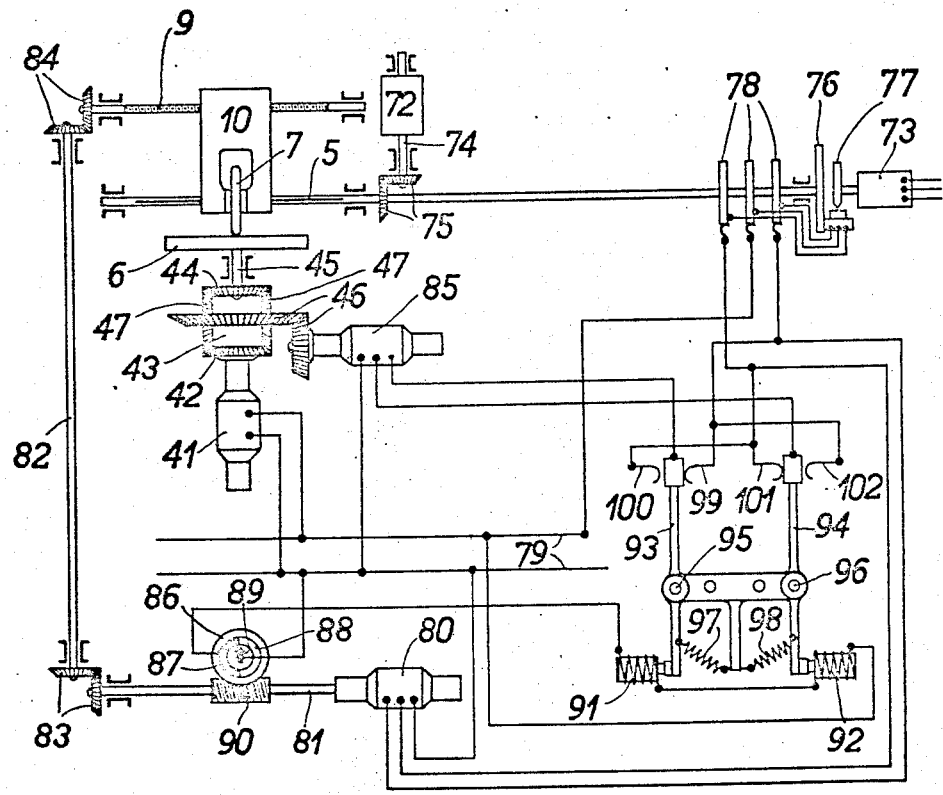

The device according to Fig. 3 serves for adjusting a member 72 according to the adjustments of the receiver 73 of an electric tele-transmitting system. Those parts of the said device which are identical with those of the apparatus according to Fig. 1 are designated same as the latter. The member 72 is disposed on a shaft 74 which is coupled with the driven shaft 5 of the friction gearing 6, 7 by means of a pair of bevel gears 75. Shaft 5 carries the one member 76 of a following device whose other member 77 is mounted on the receiver 73. Via a slip ring arrangement 78 and a circuit 79 the following device 76, 77 controls a reversing motor 80 in such a manner that, with an acceleration of the member 77 relative to the member 76, it runs in one direction and, when retarded, in the other, while it is at rest when the two members are in uniform movement. The motor 80 is coupled with the spindle 9 by means of two shafts 81 and 82 and of two pairs of bevel gears 83 and 84. A reversing motor 85 serves for driving the pair of bevel gears 46 to give the planet pinions 47 of the differential 43 a rotation about the coinciding axes of the two crown wheels 42 and 44 and an additional rotation therefore to the shaft 45 driven by motor 41. The reversing motor 85 is required to alter its sense of rotation on the one hand when changing between the acceleration and retardation of the member 77 relative to the member 76 takes place, and on the other, when in its displacement relative to the friction disc 6 the friction wheel 7 passes through the centre of the friction disc 6.

To satisfy this requirement the following arrangement is provided for. On a permanently disposed disc 86 an annular copper strip 87 and an annular insulating strip 88 are arranged in such a manner that both strips form a complete ring. Said ring and a contact lever 89 rotatable about the axis of said ring form a switching device. The contact lever 89 is so attached to a worm gear (not shown in the drawings) meshing with a worm 90 fitted to the shaft 81 that it coincides at the point of contact between the two strips 87 and 88 when the friction wheel 7, as shown in the drawings, touches the centre of friction disc 6. The described switching device is so connected with the circuit 79 and with two electromagnets 91 and 92 that the magnets— according to whether the contact lever 89 touches the copper strip 87 or the insulating strip 88— are charged with current or are dead. The magnets 91 and 92 cooperate with the contact levers 93 or 94, respectively, each of which is pivotally disposed around a permanently fitted pin 95, or 96, respectively, and each of which is subjected to the action of a spring 97, or 98, respectively, counteracting the respective magnets. Depending upon whether the magnet 91 carries current or not the contact lever 93 closes a contact 99 or 100 and, depending upon whether the magnet 92 carries current or not, the contact lever 94 closes a contact 101 or 102. The contact levers 93 and 94, as well as the contacts 99, 100, 101 and 102, the reversing motor 85 and the slip-ring arrangement 78 are so connected by electric wires that the aforesaid requirement is satisfied.

Figure 4:
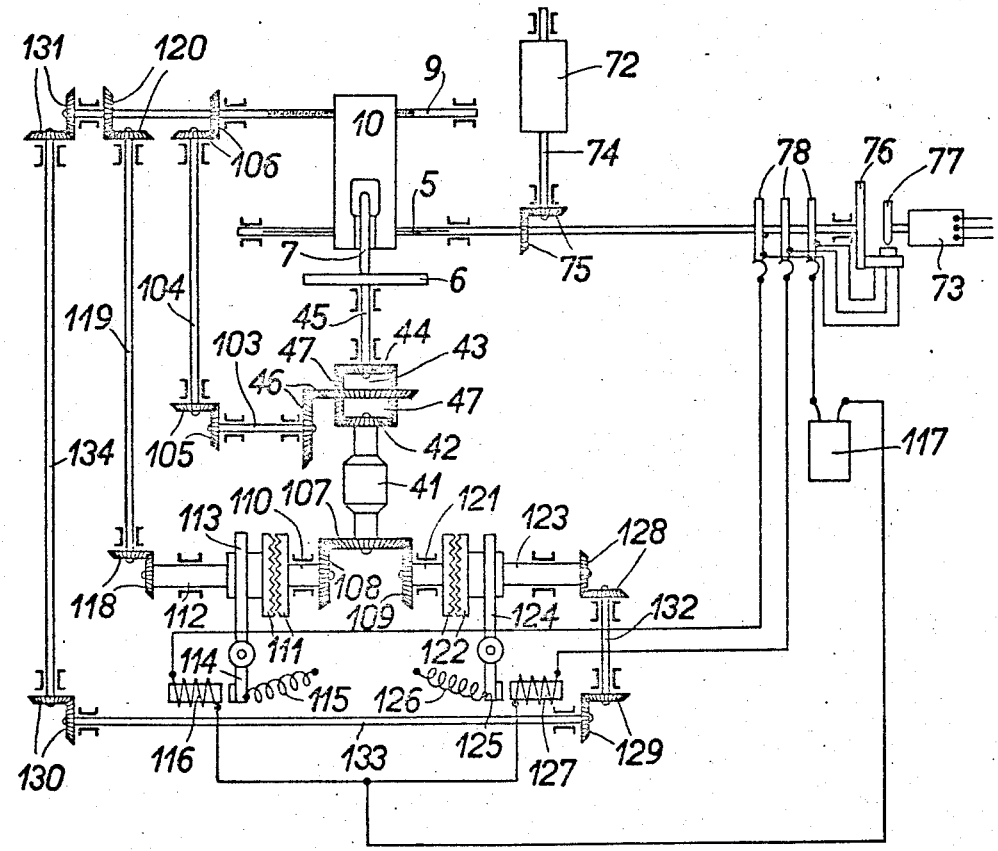

The device according to Fig. 4 is intended for the same purpose as the device according to Fig. 3. It differs from the latter by the electric control means being of another design, that motor only being required for operation, which is anyway provided for driving the speed changing gear. For the sake of simplicity the sense of rotation of the receiver 73 has been assumed to remain the same for the device according to Fig. 4. What is required therefore is that the friction wheel is adjusted relative to the friction disc 6 merely between the centre and the one edge of the latter so that the device provided for in Fig. 3, viz., for changing the rotational sense of the additional rotation of the friction disc 6 in connection with the position of the friction wheel 7 relative to the friction disc 6 can be dispensed with. The designations of Fig. 3 have been maintained as far as possible.

In Fig. 4 the pair of bevel gears 46 is coupled with the spindle 9 by means of two shafts 103 and 104, as well as by two pairs of bevel gears 105 and 106. On the shaft of the motor 41 a bevel gear 107 meshing two bevel gears 108 and 109 is mounted. The bevel gear 108 is mounted on a shaft 110 carrying the fixed part of a clutch coupling 111. The movable part of this clutch coupling is guided on a shaft 112 by means of slot and key. The one arm 113 of a two-arm lever pivotally mounted around a permanent axis engages a ring groove of the said movable part, while the other arm 114 is subjected to the action of a spring 115 which tends to hold the lever 113, 114 in that respective position where the clutch coupling 111 is disengaged. Co-acting with the arm 114 is a magnet 116 which when excited overcomes the tension of the spring 115 and brings the lever 113, 114 into that respective position where the clutch coupling engages. With the one coil-end the magnet 116 is connected to the slip-ring arrangement 78 and with the other coil-end to a pocket-lamp battery 117 which is likewise in connection with the slip-ring arrangement 78. The magnet 116 is excited when the member 77 accelerates relative to the member 76 of the follower mechanism. By means of a pair of bevel gears 118 as well as of a shaft 119 and of a pair of bevel gears 120 the shaft 112 is so coupled with the spindle 9 that the carrier 10—with the clutch coupling 111 engaged—experiences a displacement in the direction of the arrow as shown in the drawings, whereby as a result of the spindle 9 being coupled with the pair of bevel gears 46 the crown wheel 44 of the differential 43 experiences a rotation in the same sense as under the effect of the motor 41. The bevel gear 109 is mounted upon a shaft 121 carrying the fixed part of a clutch coupling 122. The movable part of this clutch coupling is keyseated on a shaft 123. The one arm 124 of a two-arm lever pivotally mounted around a permanent axis engages a ring groove of the said movable part, while the other arm 125 is subjected to the action of a spring 126 which tends to hold the lever 124, 125 in that respective position where the clutch coupling 122 is disengaged. Co-acting with the arm 125 is a magnet 127 which when excited overcomes the tension of a spring 126 and brings the lever 124, 125 into that respective position where the clutch coupling is engaged. With the one coil-end the magnet 127 is connected to the slip-ring arrangement 78 and with the other coil-end to the pocket lamp battery 117. The magnet is excited when the member 77 is retarded relative to the member 76 of the following mechanism. By means of four pairs of bevel gears 128, 129, 130 and 131, as well as by three shafts 132, 133 and 134 the shaft 123 is so coupled with the spindle 9 that the carrier 10—with clutch coupling 122 engaged—experiences a displacement in a direction opposite to that indicated by the arrow in the drawings.

I claim:

1. In a device which forms part of a directing or calculating apparatus and serves for displacing an element according to the movements of variable speed of a body, a speed change gear having a driving shaft, a driven shaft and adjusting means, means for actuating said adjusting means, means for operatively connecting said driven shaft to said element, a motor, a differential gear, means for operatively connecting said motor by means of said differential gear to said driving shaft, and means for operatively connecting one member of said differential gear to said adjusting means and adapted to cause the absolute value of the angular speed of said driving shaft to change always in the same sense as the absolute value of the angular speed of said driven shaft is changed when said actuating means are effected.

2. In a device which forms part of a directing or calculating apparatus and serves for displacing an element according to the movements of variable speed of a body, a speed change gear having a driving shaft, a driven shaft and adjusting means, said speed change gear allowing the sense of rotation of said driven shaft to be reversed, means for actuating said adjusting means, means for operatively connecting said driven shaft to said element, a motor, a differential gear, means for operatively connecting said motor by means of said differential gear to said driving shaft, and means for operatively connecting one member of said differential gear to said adjusting means and adapted to cause the absolute value of the angular speed of said driving shaft to change always in the same sense as the absolute value of the angular speed of said driven shaft is changed when said actuating means are effected, said last operatively connecting means comprising means for reversing the sense of rotation of said one member when the sense of rotation of said driven shaft is reversed.

3. In a device which forms part of a directing or calculating apparatus and serves for displacing an element according to the movements of variable speed of a body, a speed change gear having a driving shaft, a driven shaft and adjusting means, means for actuating said adjusting means, a differential gear operatively connecting said element to said driven shaft and to said adjusting means and adapted to cause said element to move according to the rotation of said driven shaft as well as according to the movement of said actuating means, a motor, a second differential gear, means for operatively connecting said motor by means of said second differential gear to said driving shaft, and means for operatively connecting one member of said second differential gear to said adjusting means and adapted to cause the absolute value of the angular speed of said driving shaft to change always in the same sense as the absolute value of the angular speed of said driven shaft is changed when said actuating means are effected.

4. In a device which forms part of a directing or calculating apparatus and serves for displacing an element according to the movement of variable speed of the receiver of an electric tele-transmitting system, a speed change gear having a driving shaft, a driven shaft and adjusting means, means for actuating said adjusting means, means for operatively connecting said driven shaft to said element, a motor, a differential gear, means for operatively connecting said motor by means of said differential gear to said driving shaft, and means for operatively connecting one member of said differential gear to said actuating means and adapted to cause the absolute value of the angular speed of said driving shaft to change always in the same sense as the absolute value of the angular speed of said driven shaft is changed when said actuating means are effected, said actuating means comprising a follower mechanism and control means, said follower mechanism having two members displaceable relative to each other, one of said two members being operatively connected to said receiver and the other to said element, said control means being connected to said follower mechanism and serving for releasing a power driven movement of said adjusting means when the speed of one of said two members begins to deviate from the speed of the other members.

5. In a device which forms part of a directing or calculating apparatus and serves for displacing an element according to the movement of variable speed of the receiver of an electric tele-transmitting system, a speed change gear having a driving shaft, a driven shaft and adjusting means, means for actuating said adjusting means, means for operatively connecting said driven shaft to said element, a motor, a differential gear, means for operatively connecting said motor by means of said differential gear to said driving shaft, and means for operatively connecting one member of said differential gear to said actuating means and adapted to cause the absolute value of the angular speed of said driving shaft to change always in the same sense as the absolute value of the angular speed of said driven shaft is changed when said actuating means are effected, said actuating means comprising a follower mechanism, two clutch couplings for connecting said motor to said adjusting means, two electro-magnets, each electro-magnet connected to one of said two clutch couplings, and electric control means, said follower mechanism having two members displaceable relative to each other, one of said two members being operatively connected to said receiver and the other to said element, said electric control means connecting said follower mechanism to said electro-magnets and, in the case of an increase or decrease of the relative speed of said two members causing the one or the other of said two electro-magnets to actuate the appertaining clutch coupling.

6. In a device which forms part of a directing or calculating apparatus and serves for displacing an element according to the movement of variable speed of the receiver of an electric tele-transmitting system, a speed change gear, having a driving shaft, a driven shaft and adjusting means, means for actuating said adjusting means, means for operatively connecting said driven shaft to said element, a differential gear, three electromotors, two of said electromotors by means of said differential gear being operatively connected to said driving shaft and the third to said adjusting means, the third electromotor and one of said two electromotors being reversing ones, said actuating means comprising a follower mechanism and electric control means, said follower mechanism having two members displaceable relative to each other, one of said two members being operatively connected to said receiver and the other to said element, said electric control means connecting said follower mechanism to said two reversing electromotors and, in the case of an increase or decrease of the relative speed of said two members causing said two electromotors to rotate in the one or in the other direction.

7. In a device which forms part of a directing or calculating apparatus and serves for displacing an element according to the movement of variable speed of the receiver of an electric tele-transmitting system, a speed change gear, having a driving shaft, a driven shaft and adjusting means, means for actuating said adjusting means, means for operatively connecting said driven shaft to said element, a differential gear, three electromotors, two of said electromotors by means of said differential gear being operatively connected to said driving shaft and the third to said adjusting means, the third electromotor and one of said two electromotors being reversing ones, said actuating means comprising a follower mechanism, two electro-magnets, a switching device, switching means, and electric control means, said follower mechanism having two members displaceable relative to each other, one of said two members being operatively connected to said receiver and the other to said element, said electric control means connecting said follower mechanism to said third electromotor and, in the case of an increase or decrease of the relative speed of said two members causing said third electromotor to rotate in the one or in the other direction, said switching device being operatively connected to said adjusting means and electrically connected to said electro-magnets for causing said electro-magnets to be effective, while said driven shaft is rotating in the one direction, and to be in effective, while said driven shaft is rotating in the other direction, said switching means being operatively connected to said two electro-magnets and electrically connected to said follower mechanism and to that of said two electromotors the rotation of which is reversible, said switching means causing the last said electromotor to rotate in the same direction as the said third electromotor, while said driven shaft is rotating in the one direction, and in the opposite direction of the said third electromotor, while the said driven shaft is rotating in the other direction.

KARL PAPELLO.